(12) United States Patent
Boero et al.

(10) Patent No.: US 9,525,644 B2
(45) Date of Patent: Dec. 20, 2016

(54) METHOD AND SYSTEM FOR MANAGING RESOURCES AMONG DIFFERENT CLIENTS FOR AN EXCLUSIVE USE

(71) Applicant: Siemens Aktiengesellschaft, München (DE)

(72) Inventors: Andrea Boero, Genoa (IT); Davide Corso, Genua (IT)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 880 days.

(21) Appl. No.: 13/720,029

(22) Filed: Dec. 19, 2012

(65) Prior Publication Data

US 2013/0159532 A1    Jun. 20, 2013

(30) Foreign Application Priority Data

Dec. 19, 2011 (EP) .................................... 11194246

(51) Int. Cl.
*G06F 15/173* (2006.01)
*G06F 15/16* (2006.01)
*H04L 12/911* (2013.01)

(52) U.S. Cl.
CPC ............ *H04L 47/821* (2013.01); *H04L 47/78* (2013.01); *H04L 47/783* (2013.01); *H04L 47/822* (2013.01); *H04L 47/827* (2013.01)

(58) Field of Classification Search
CPC .... H04L 47/821; H04L 47/822; H04L 47/827; H04L 47/78; H04L 47/782; H04L 47/783
USPC .................................................. 709/226, 229
See application file for complete search history.

(56) References Cited

U.S. PATENT DOCUMENTS

| 6,182,109 B1 | 1/2001 | Sharma et al. | |
| 2003/0046396 A1* | 3/2003 | Richter | G06F 9/505 709/226 |
| 2004/0174865 A1* | 9/2004 | O'Neill | 370/352 |

(Continued)

FOREIGN PATENT DOCUMENTS

EP    0794490 A2    9/1997

OTHER PUBLICATIONS

Kirchner et al.: "Pooling", Corporate Technology Siemens AG, 2002, prashant.jain@mchp.siemens.de, Munich, Germany, XP-002677112.

(Continued)

*Primary Examiner* — Kristie Shingles
(74) *Attorney, Agent, or Firm* — Laurence Greenberg; Werner Stemer; Ralph Locher

(57) ABSTRACT

A method and a system share resources of a server among different clients. The system has a server which contains a maximum number m of resources among which a predetermined number w of the resources are initializable for being kept ready for use by the clients and forming a pool. A communication system communicates with the clients. A managing device manages the resources. The managing device contains at least a processor and a memory. The managing device is able to change the status of the resource of the pool in dependence on an assignment of the resource to the client or a release of the resource at a time T4, to add a new resource to the pool, and to terminate the resource of the pool.

7 Claims, 3 Drawing Sheets

(56) References Cited

U.S. PATENT DOCUMENTS

| | | | |
|---|---|---|---|
| 2005/0033843 A1* | 2/2005 | Shahi | G06F 17/30899 709/226 |
| 2005/0144284 A1* | 6/2005 | Ludwig | H04L 12/58 709/226 |
| 2006/0136988 A1* | 6/2006 | Raja | G06F 9/5027 726/1 |
| 2007/0083868 A1* | 4/2007 | Sankaranarayan | G06F 9/5038 718/104 |
| 2008/0222620 A1* | 9/2008 | Little et al. | 717/149 |
| 2008/0250219 A1* | 10/2008 | Shimada | G06F 3/0607 711/173 |

OTHER PUBLICATIONS

Jain: "Evictor", Siemens AG, Corporate Technology, Munich, Germany, 2001; DE; XP-002677113.

* cited by examiner

METHOD AND SYSTEM FOR MANAGING RESOURCES AMONG DIFFERENT CLIENTS FOR AN EXCLUSIVE USE

CROSS-REFERENCE TO RELATED APPLICATION

This application claims the priority, under 35 U.S.C. §119, of European application EP 11 194 246.2, filed Dec. 19, 2011; the prior application is herewith incorporated by reference in its entirety.

BACKGROUND OF THE INVENTION

Field of the Invention

The present invention relates to the allocation of shared resources between clients, in particular in the field of computer science. More precisely, the present invention relates to a method and a system for managing or sharing resources between different clients for an exclusive use, and in particular for sharing server resources between different clients in a client-server communication network.

Industrial automation has increased in scope and refinement with time. In general, industrial automation has focused on continuous processes containing a plurality of interacting machines. This covers in particular a broad range of manufacturing execution systems which are offered by Siemens Corporation under its SIMATIC® product family. In such an environment, a common setting in data processing consists in distributed client work machines, hereafter clients, with client program/application usually requesting services from client-server systems, hereafter servers. At least one client close to the technical and/or logistical process is thus connected to at least one server by a communication network.

A finite number of resources of the server is shared between the clients for an exclusive use. A typical design pattern used to implement a set of shared resources is the object pool pattern: initialized resources of the server are objects kept ready for use in a "pool" and assigned to requesting clients. In other words, a client of the pool may request an object (or resource) from the pool and perform operations on the returned object (or resource). A resource that is currently assigned to a client is marked as "in use" and cannot be assigned to other clients. When the client using a resource no longer needs it, it releases it to the pool and the resource is marked as "available". If a client makes a request while all resources are in use it typically waits until either a resource is available or a timeout is reached.

Determining the proper total number of resources in the pool (known as "pool size"), for instance for a specific application, is often a critical choice: a small pool size will lead to longer waits (and frequent timeouts) during peak times, while a large pool size could exceed the system capabilities. The initial size of the pool depends in particular on a request distribution and a number of clients. It might be determined empirically by using for instance series of empirical "guess and check" iterations. The management of the resources of the pool over time depends then on the technique and methodology used. For example, an Oracle database resource manager is able to pre-allocate a minimum amount of resources to some clients regardless of the load of the system and number of clients, and distribute available resources in a way that for example some tasks are prioritized over others. In case of an increase of the number of requests for resources, it can create new shared resources up to a maximum for facing the demand, and then, it releases on a time-basis the created resources if they are not used anymore during a predetermined time period.

An efficient management of the resources is particularly important during peak periods, since during high resource demands, the server is for instance using the maximum of its capabilities. Therefore, the way of managing the resources will determine the number of requests over time that might be executed by the server, and therefore decreases the average wait time between the reception of a client request and its execution.

SUMMARY OF THE INVENTION

It is therefore an objective of the present invention to provide a method and a system for efficiently managing resources between different clients over time.

The objective is achieved according to the present invention with respect to the method by a method for sharing resources of a server among different clients, wherein the server contains a maximum number m of resources among which a predetermined number w of the resources are initialized and kept ready for use for the clients and are contained in a pool. Each resource of the pool is characterized by two statuses, either "in use" or "available" if the resource is respectively assigned to, or available for, the client. The method includes allocating a resource to a client by the now described steps.

a). The server receives a request for using one server resource, wherein the request is generated and sent by one of the clients, for instance via a communication network.

b). If at least one server resource is available in the pool, then the one resource is allocated to the client and the status of the allocated resource is changed from "available" to "in use", otherwise, if each resource of the pool is "in use", then determining if the maximum number m of resources is used and:

b1). If the maximum number m of resources of the server is not used, then initializing a new resource and adding the new resource to the pool.

b2). If the maximum number m of resources of the server is used and if a timeout is not reached, then returning to the top of step b.

b3). If the maximum number m of resources of the server is used and if the timeout is reached, then returning to the client request an error.

A release at a time T4 of a server resource containing the changing the status of the released resource from "in use" to "available", and characterized in that:

c). If the pool contains p resources at the time T4, wherein $m \geq p > w$, then terminating p−w resources among the available resources of the pool if and only if a number p_u of "in use" resources at the time T4 is inferior to the predetermined number w, i.e. p_u<w, wherein terminating a resource refers to the de-initialization of the resource by the server;

d). otherwise, maintaining the resources of the pool initialized independently of the time.

The objective is also achieved according to the present invention with respect to the system by a system for sharing resources of a server among different clients. The system contains a server which contains a maximum number m of resources among which a predetermined number w of the resources are initializable for being kept ready to use for the clients and forming therefore a pool. Each resource of the pool is characterized by two statuses, either "in use" or "available" if the resource is respectively assigned to, or available for, the client. The system has a communication system for communicating with the clients and a managing device for managing the resources. The managing device contains at least a processor and a memory. The managing device is able: to change the status of the resource of the pool in dependence on an assignment of the resource to the client or a release of the resource, i.e. its return to the pool, to add a new resource to the pool, and to terminate the resource of the pool, i.e. to de-initialize it and therefore remove it from the pool. The memory contains instructions:
a) for determining the number p of resources comprised in the pool at a time T4, and for determining among the p resources, the number p_u of resources that are "in use" at said time T4;
b) for terminating p−w resources among the p−p_u available resources of the pool if and only if at the time T4, m≥p>w and p_u<w; and
c) for maintaining the resources of the pool initialized independently of the time if at the time T4, p≤w or p_u>w.

The proposed invention can be applied to any situation in which a finite number of resources must be shared among different clients for an exclusive use, and is therefore not only restricted to servers and communication networks, but can be applied to various domains. Therefore, the wording client may not only refer to client work machine, but to any resource user, while the wording server may refer to any resource provider. The present invention is particularly useful where resource initialization and deinitialization time is relevant, i.e. when it is advantageous to maintain a set of initialized resources assigned to requesting clients as long as needed. The pool according to the present invention is the set of initialized resources kept ready to use for clients.

Other features which are considered as characteristic for the invention are set forth in the appended claims.

Although the invention is illustrated and described herein as embodied in a method and a system for managing resources among different clients for an exclusive use, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1A:
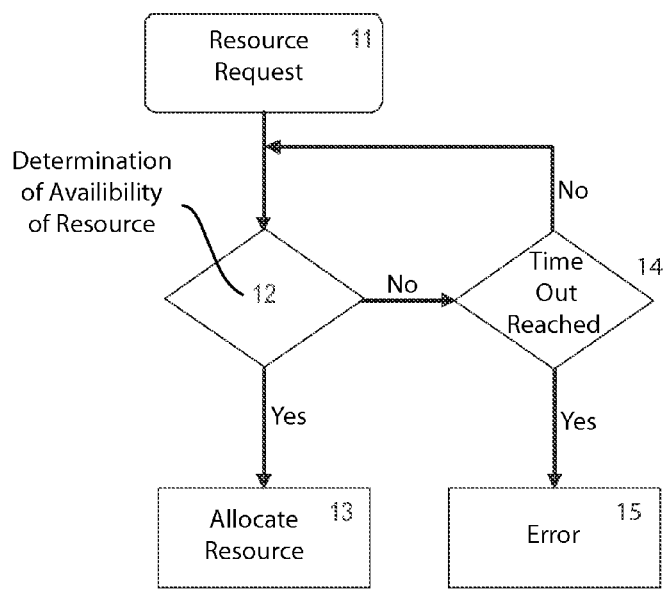
FIG. 1A is a flow chart showing a first functionality according to the prior art.
Figure 1B:
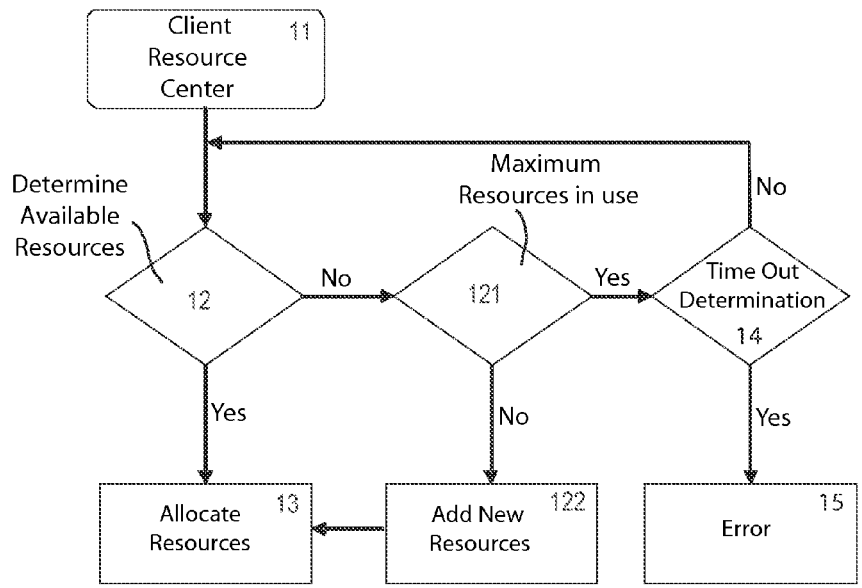
FIG. 1B is a flow chart showing the first functionality according to the invention.
Figure 2A:
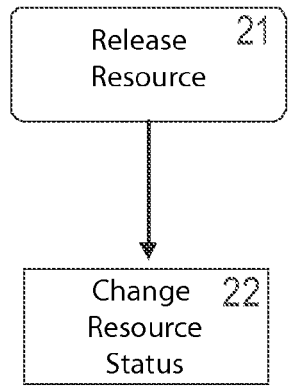
FIG. 2A is a flow chart showing a second functionality according to the prior art.
Figure 2B:
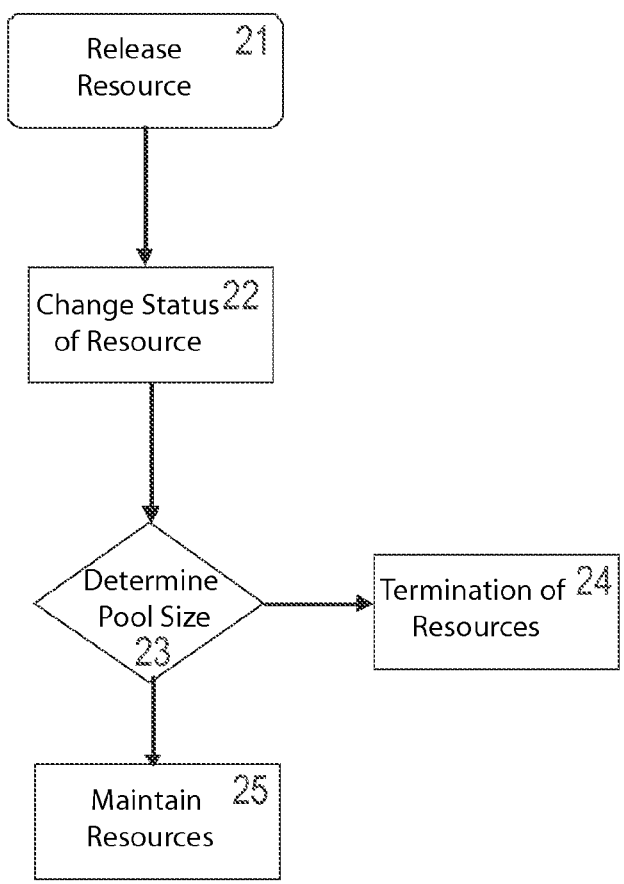
FIG. 2B is a flow chart showing the second functionality according to the invention.

Referring now to the figures of the drawing in detail and first, particularly, to FIGS. 1A-2B thereof, there is shown schematically two functionalities exposed by a basic pool interface, respectively a "get" functionality (FIGS. 1A and 1B) which is related to the assignment of a resource to a client request according to a traditional prior art technique (FIG. 1A) and according to the present invention (FIG. 1B), and a "release" functionality (FIGS. 2A and 2B) which is related to the release of an assigned resource according to a prior art technique (FIG. 2A) and according to the present invention (FIG. 2B). The get and release functionalities are involved in the sharing of the pool resources between the pool clients.

In the traditional prior art technique illustrated in FIG. 1A, a resource provider or server generally contains a maximum number m of resources among which a predetermined number w of the resources are maintained initialized in order to be kept ready for use by the clients or resource users. The initialized resources are contained in a pool of the server, and the steps for assigning a pool resource to a client according to the prior art technique are as now described.

A client request 11 for a resource is received by the server, the request 11 requesting an allocation of a server resource to the client.

A determination 12 is made by the server of the number of available resources in the pool, and if at least one resource is available for the client, then an allocation 13 of the server resource to the client.

Otherwise if each resource of the pool is in use, then determine if a timeout is reached. The timeout is a predefined time limit that might be recorded in the server as a parameter, and the step of determining if the timeout is reached, hereafter referred to as timeout determination 14, containing determining if the time period separating the reception of the request from the timeout determination 14 is greater than or equal to the predefined time limit.

If the timeout is not reached, i.e. if the time period separating the reception of the request from the timeout determination is not greater than the predefined time limit, then returning to step 12, otherwise if the timeout is reached, returning an error 15 to the client.

According to the present invention, new steps are added to the prior art technique for increasing the efficiency of the get functionality. Indeed, the steps for assigning a server resource to a client are illustrated in FIG. 1B and are now described.

A client request 11 for a resource is received by a server, e.g. at a time T1, wherein the request might be in particular time-stamped by the server for associating the time T1 to the request 11. The request 11 requests an allocation of a server resource to the client, the request being in particular generated and sent by the client and received by a communication device of the server. The server and the client might be connected e.g. by a communication network configured for connecting each client to the server.

A determination 12 is made by the server of the number of available resources for the client in the pool. The determination 12 is e.g. performed at a time T2>T1, and if at least one resource of the pool is available for the client, then an allocation 13 of the one resource to the client is performed. The status of the allocated resource is in particular changed by the server from "available" to "in use". Otherwise, if each resource of the pool is "in use", i.e. if no resource is available in the pool, then determine 121 if the maximum number m of resources is used and if the maximum number m of resources of the server is not used, then an initialization 122 of a new resource and adding the new resource to the pool. Wherein the new resource is in particular allocated to the client from that originated the request 11.

If the maximum number m of resources of the server is used, then performing a timeout determination 14 as previously described for FIG. 1A. The timeout determination is e.g. performed at a time T3 and configured for determining if the time period separating the reception of the request from the timeout determination 14 is greater or equal to a predefined time limit TL, i.e. if T3−T1≥TL and if T3−T1<TL, then returning to step b; otherwise
if T3−T1≥TL, then returning to the client an error 15.

Preferentially, the server is able to prioritize the allocation of a resource to a request or a client from respectively other requests or clients. For this purpose, the server may contain a databank containing a prioritizing list that ranks clients or requests according to a prioritization scheme. Advantageously, the method according to the invention contains in particular a prioritization of the allocation of a resource to a client or request in dependence on a rank of the client or request. For example, if two requests are received by the server at the same time T1, then the higher ranked request or the request of the higher ranked client will have the priority over the other request, that is an available resource will be preferentially allocated to the higher ranked request or to the request of the higher ranked client. By the same way, if several requests have been received by the server without leading to an allocation of a server resource due to the fact that all server resources are in use, and if the timeout of each request is not yet reached, then the system according to the present invention is in particular able to allocate the first available resource to the higher ranked request or to the request of the higher ranked client which has been temporally first received.

When a resource is returned to a client, the client may then use the resource for performing some operations. Preferentially, at least one condition of allocation might be associated to each allocation 13 of a resource to a client. Each condition of allocation is then controlled during the period of time the resource is allocated to the client to determine if the condition is respected. An example of an allocation condition is a restriction of the allocation time of a resource to a predetermined time period. For instance, if the client uses the resource during a time period greater than the predetermined time period, then the server automatically releases the resource. During the time period the client uses the resource, the resource is not available for another request, i.e. for another client.

In case of an increase of the requests for resources, the number of resources contained in a traditional pool might not be sufficient anymore for treating efficiently each new entering request. Advantageously, for providing an efficient response to the entering requests, the system according to the invention is able to add new resources to the pool, and thus to initialize new resources up to the maximum of available resources for the server. Adding new resources to the pool allows too increase the number of requests treated by unit of time. But for an efficient treatment of the requests during peak periods, the release of resources shall also be efficient.

FIG. 2A illustrates schematically the release functionality according to a prior art technique. Once a client has finished with the resource, it returns the resource to the pool. In particular also, once an allocation condition is not respected, then the server releases the resource and returns it to the pool. The standard release of a resource includes main steps: a release 21 of the resource which is returned to the pool, and then a change 22 of the status of the released resource from "in use" to "available".

FIG. 2B illustrates a new method for releasing a resource according to the present invention. In case of a release 21 at a time T4 of an allocated resource, the resource is returned to the pool and the method then further includes a change 22 of the status of the resource from "in use" to "available", the change 22 being executed by the server.

A pool size determination 23 for determining the size of the pool at the time T4, i.e. the number of resources contained in the pool at the time T4 is performed. If the pool contains p resources at the time T4, wherein m≥p>w, then the method includes a termination 24 of p−w resources among the available resources of the pool if and only if a number p_u of "in use" resources at the time T3 is inferior to the predetermined number w, i.e. if p_u<w. Otherwise, the method includes a maintain 25 of the resources of the pool initialized independently of the time.

Figure 3:
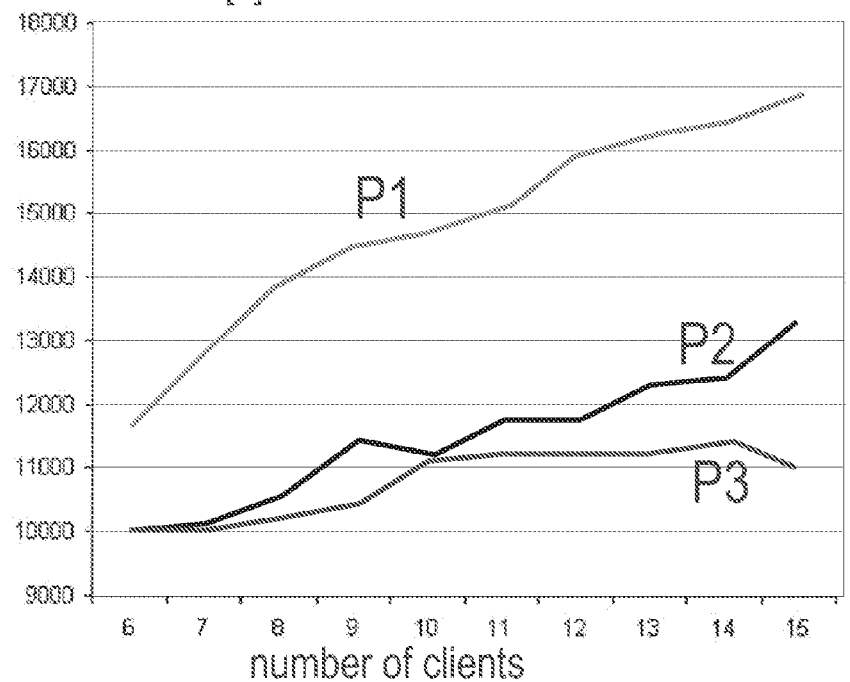
FIG. 3 is a graph showing total execution time versus a number of clients according to a traditional P1, an Oracle P2, and the present invention's P3 pools.
Figure 4:
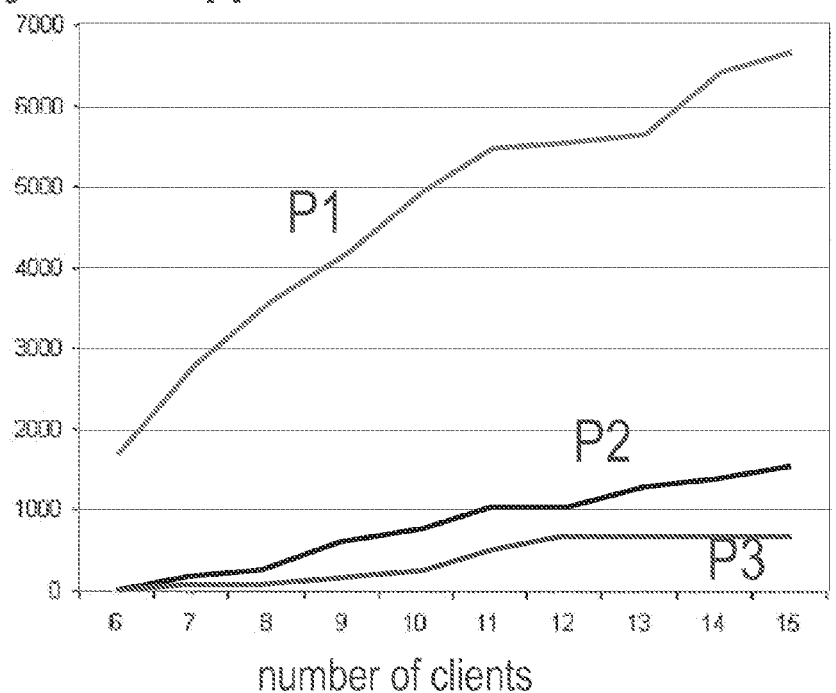
FIG. 4 is graph showing an average wait time versus the number of clients according to a traditional P1, an Oracle P2, and the present invention's P3 pools.

The advantages of the present invention compared to prior art techniques are highlighted in FIGS. 3 and 4. FIGS. 3 and 4 present a comparison between a traditional pool management P1, an Oracle-like pool management P2 and a pool management according to the present invention P3. FIG. 3 shows the total execution time in dependence on the number of clients and FIG. 4 the average wait time in dependence on the number of clients. The traditional pool contains five resources, i.e. the maximum number m_P1 of the resources of the server is five and corresponds to the number of initialized resources w_P1. The Oracle-like pool contains 5 preallocated resources, i.e. w_P2=5, with a maximum number m_P2 of server resources equal to ten: m_P2=10. The pool according to the present invention contains a number of five initialized resources, i.e. w_P3=5, with a maximum number m_P3 of server resources equal to ten: m_P3=10. For comparing the management of the pools according to the traditional, Oracle-like, and present invention technique, the clients request resources to the pool according to the following statistics: 6 clients continuously request resources and use them for a long time period in order to always have at least 5 resources in use, and all the remaining clients request resources in a "burst mode", i.e. using them for a short time period, wherein a large gap occurs between two successive bursts, and the timeout of the Oracle-like technique is slightly shorter than the average gap between the two successive bursts. From such kind of distribution, the graphs presented in FIGS. 3 and 4 clearly show that the present invention allows a shorter execution time of the requests for a same number of clients, as well as a shorter average wait time experienced by the clients before the requested resource is available, mainly due to the fact that according to the present invention, the release of the resource is independent of the time.

The invention claimed is:

1. A method for sharing resources of a server among different clients, the server containing a maximum number m of resources among which a predetermined number w of the resources are initialized and kept ready for use for the clients and are contained in a pool, which method comprises the steps of:

releasing at a time T4 a resource of the server, wherein a status of the resource released being changed from "in use" to "available";

determining a size of the pool at the time T4; and if the pool contains p resources at the time T4, wherein m≥p>w, then terminating p−w resources among available resources of the pool if and only if a number p_u of the "in-use" resources at the time T4 is inferior to the predetermined number w; or otherwise, maintaining the resources of the pool initialized independently of time.

2. The method according to claim 1, which further comprises performing an allocation of the resource to a client by the further steps of:

a) receiving by the server of a client request for using one of the resources;

b) determining a number of available resources for the client in the pool; and if at least one of the resources is available in the pool, then allocating the one resource to the client and changing a status of the resource allocated from "available" to "in use", otherwise;

if each of the resources of the pool is "in use", then determining if the maximum number m of the resources is used;

if the maximum number m of the resources of the server is not used, then initializing a new resource and adding the new resource to the pool;

if the maximum number m of the resources of the server is used and if a timeout is not reached, then returning to step b; and if the maximum number m of the resources of the server is used and if the timeout is reached, then returning to the client request an error.

3. The method according to claim 1, which further comprises prioritizing an allocation of the resource to the client or a request in dependence on a rank of the client or the request.

4. The method according to claim 1, which further comprises setting at least one condition for allocation of the resource to the client.

5. A system for sharing resources among different clients, the system comprising:

a server having a maximum number m of resources among which a predetermined number w of said resources are initializable for being kept ready for use by the clients in a pool;

a communication system for communicating with the clients;

a managing device for managing said resources, said managing device having at least a processor and a memory, said managing device being able to:

change a status of a resource of said pool in dependence on an assignment of said resource to a client or a release of said resource at a time T4;

to add a new resource to the pool;

to terminate said resource from the pool;

said memory containing instructions to:

determine a number p of said resources contained in said pool at the time T4, and to determine among said p resources, a number p_u of said resources that are "in use" at the time T4;

terminate p−w resources among the p−p_u available resources of said pool if and only if at said time T4, m≥p>w and p_u<w; and maintain said resources of said pool initialized independently of the time if at said time T4, p≤w or p_u>w.

6. The system according to claim 5, wherein said server has a databank with a prioritizing list of at least one of the clients or the requests.

7. The system according to claim 5, wherein said server is able to timestamp a reception of a request.

* * * * *